United States Patent [19]

Schlesinger

[11] Patent Number: 5,270,455

[45] Date of Patent: Dec. 14, 1993

[54] POLYAZO DYES CONTAINING RESORCINOL AS MIDDLE COMPONENT AND METAL COMPLEXES THEREOF

[75] Inventor: Ulrich Schlesinger, Binzen, Fed. Rep. of Germany

[73] Assignee: Ciba-Geigy Corporation, Ardsley, N.Y.

[21] Appl. No.: 920,022

[22] Filed: Jul. 27, 1992

Related U.S. Application Data

[63] Continuation of Ser. No. 594,890, Oct. 9, 1990, abandoned.

[30] Foreign Application Priority Data

Oct. 12, 1989 [CH]  Switzerland .................. 3720/89

[51] Int. Cl.$^5$ .................... C09B 33/18; C09B 33/00; C09B 35/40; D06P 1/10
[52] U.S. Cl. .................... 534/684; 534/685; 534/582; 534/583; 534/602; 534/850; 534/599; 534/688
[58] Field of Search .................... 534/684, 685

[56] References Cited

U.S. PATENT DOCUMENTS

| | | | |
|---|---|---|---|
| 2,152,652 | 4/1939 | Lange et al. | 534/684 |
| 2,259,734 | 10/1941 | Crossley et al. | 534/684 |
| 2,259,735 | 10/1941 | Crossley et al. | 534/684 |
| 2,259,736 | 10/1941 | Crossley et al. | 534/684 |
| 4,563,520 | 1/1986 | Bergmann | 534/678 |

FOREIGN PATENT DOCUMENTS

| | | | |
|---|---|---|---|
| 0034724 | 9/1981 | European Pat. Off. | 534/684 |
| 465138 | 5/1987 | United Kingdom | 534/684 |

*Primary Examiner*—Floyd D. Higel
*Attorney, Agent, or Firm*—Kevin T. Mansfield; Edward McC. Roberts

[57] ABSTRACT

A metal complex suitable as dyes for the dyeing of a wide range of textile and non-textile materials, particularly leather and fur, said metal complex of a compound of the formula

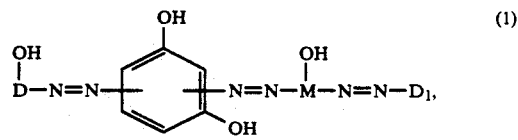

(1)

in which D and D$_1$, independently of one another, are each the radical of a diazo component of the benzene or naphthalene series and M is a phenylene radical which may be further substituted.

9 Claims, No Drawings

POLYAZO DYES CONTAINING RESORCINOL AS MIDDLE COMPONENT AND METAL COMPLEXES THEREOF

This application is a continuation of application Ser. No. 594,890, filed Oct. 9, 1990, now abandoned.

The present invention relates to novel metal-containing polyazo dyes, processes for their preparation and their use for the dyeing of a wide range of textile and non-textile materials, in particular leather.

The invention accordingly relates to metal complexes of component of the formula

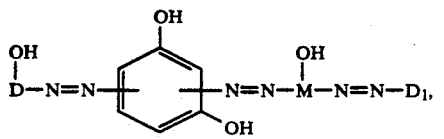

in which D and $D_1$, independently of one another, are each the radical of a diazo component of the benzene or naphthalene series and M is a phenylene radical which may be further substituted.

The diazo radical D is derived, for example, from a 1- or 2-naphthylamine or aminobenzene, it being possible for the aromatic amines to have in each case a hydroxyl group in the ortho position relative to the amino group and furthermore to be further substituted by one or more identical or different radicals.

Examples of suitable substituents on the phenyl or naphthyl radical D are $C_1$-$C_4$alkyl, which here and hereinafter generally comprises methyl, ethyl, n- or iso-propyl or n-, iso-, sec- or tert-butyl; $C_1$-$C_4$alkoxy, which generally is understood to mean methoxy, ethoxy, n- or iso-propoxy or n-, iso-, sec- or tert-butoxy; halogen, for example fluorine, bromine and in particular chlorine; trifluoromethyl; $C_1$-$C_4$alkylsulfonyl, in particular methyl- or ethylsulfonyl; sulfamoyl; N-mono- or N,N-di-$C_1$-$C_4$alkylsulfamoyl; carbamoyl; N-mono- or N,N-di-$C_1$-$C_4$alkylcarbamoyl, sulfo; nitro; cyano; carboxyl; phenoxy; $C_1$-$C_4$alkanoylamino; in particular acetylamino or propionylamino; benzoylamino; $C_1$-$C_4$alkoxycarbonyl, for example methoxy- or ethoxycarbonyl.

In the case where D—OH is the radical of an o-aminophenol, it is preferably unsubstituted or further substituted, for example, by chlorine, nitro, sulfo, methyl, methoxy, methylsulfonyl, carbamoyl and/or sulfamoyl.

However, D—OH is preferably the radical of an unsubstituted or, for example, sulfo-, nitro-and/or chlorine-substituted aminonaphthol. Examples are
1-amino-2-hydroxynaphthalene-4-sulfonic acid,
1-amino-2-hydroxy-6-nitronaphthalene-4-sulfonic acid,
1-amino-2-hydroxy-6-chloronaphthalene-4-sulfonic acid,
1-amino-2-hydroxynaphthalene-4,6-disulfonic acid.

A particularly preferred embodiment of the present invention relates to metal complexes of compounds of the formula (1) in which D—OH is the radical of 1-amino-2-hydroxy-6-nitronaphthalene-4-sulfonic acid.

$D_1$ is, for example, the radical of an aminobenzene or aminonaphthalene, which is in each case unsubstituted or further substituted, for example, as described above for the radical D.

$D_1$ is preferably the radical of an aminobenzene or of 1- or 2-naphthylamine, which in each case is unsubstituted or further substituted, for example, by sulfo, nitro, chlorine, methyl, methoxy, methylsulfonyl, carbamoyl and/or sulfamoyl.

$D_1$ is particularly preferably the radical of an unsubstituted or sulfo-substituted aminobenzene or of 1- or 2-naphthylamine.

An especially preferred embodiment of the present invention relates to metal complexes of compounds of the formula (1) in which $D_1$ is the radical of aniline-2-, -3- or -4-sulfonic acid.

The phenylene radical M is unsubstituted or further substituted by the radicals mentioned above for D.

The radical —M(OH) preferably has the formula

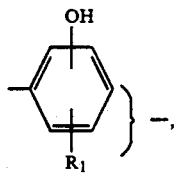

in which $R_1$ is, for example, hydrogen, $C_1$-$C_4$alkyl, $C_1$-$C_4$alkoxy, halogen, nitro or sulfo.

—M(OH)— is particularly preferably a radical of the formula

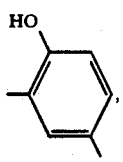

in which the hydroxyl group is in the o-position relative to the azo group linking M with resorcinol.

Examples of suitable metal complexes of the compounds of the formula (1) are cobalt, nickel, chromium, copper or iron complexes; depending on the coordination number of the metal atom and the conditions during the metallization, they are 1:1 or 1:2 metal complexes. Copper, chromium, cobalt and in particular iron complexes of compounds of the formula (1) are preferred.

A preferred embodiment of the present invention relates to cobalt, nickel, chromium, copper or iron complexes of compounds of the formula

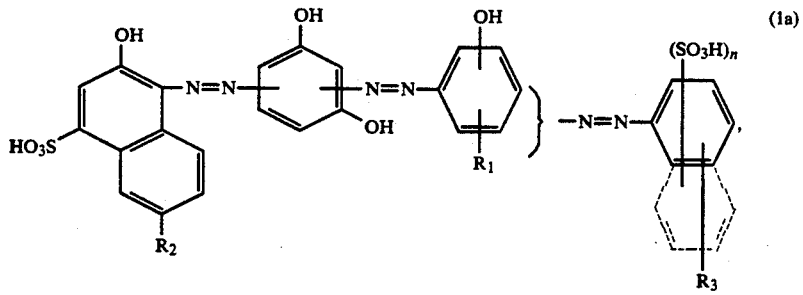

in which $R_1$ is as defined above, $R_2$ is hydrogen, nitro, sulfo or chlorine, $R_3$ is hydrogen, nitro, chlorine, methyl, methoxy, methylsulfonyl, carbamoyl or sulfamoyl and n is the number 0 or 1.

A particularly preferred embodiment of the present invention relates to cobalt, chromium, copper and in particular iron complexes of compounds of the formula

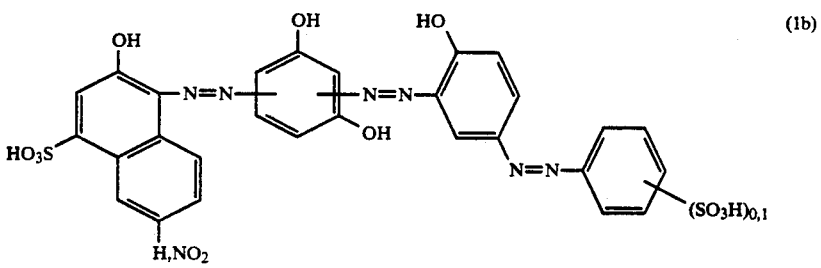

The metal complexes of the compounds of the formula (1) can be prepared in a manner known per se, for example by a) diazotizing a compound of the formula $$D_1-NH_2 \quad (3),$$

in which $D_1$ is defined as above, and coupling the product onto a compound of the formula $$R_4-HN-M \overset{\underset{|}{OH}}{\phantom{M}} \quad (4)$$

in which M is as defined above and $R_4$ is $C_2$-$C_4$alkanoyl, for example propionyl, butyryl and in particular acetyl, or is benzoyl, b) converting the resulting monoazo compound of the formula $$R_4-HN-M-N=N-D_1 \overset{\underset{|}{OH}}{\phantom{M}} \quad (5)$$

by hydrolysis into the corresponding aminoazo compound, then diazotizing this compound and coupling the product onto 1,3-dihydroxybenzene (resorcinol), c) diazotizing a compound of the formula $$D-NH_2 \overset{\underset{|}{OH}}{\phantom{M}} \quad (6)$$

and coupling the product onto the product obtained according to b) and d) metallizing the trisazo product obtained according to c) with a metal-releasing agent.

In the compounds of the formulae (5) and (6), D, $D_1$, M and $R_4$ are each as defined above.

The compounds of the formulae (3), (4) and (6) are known or can be obtained in a manner known per se.

The diazotization of the compounds of the formulae (3) and (6) and of the hydrolyzed compound of the formula (5) is carried out in each case in a manner known per se, for example by means of a nitrite, for example an alkali metal nitrite, such as sodium nitrite, in a mineral acid medium, for example in a hydrochloric acid medium, at temperatures of $-5°$ to $30°$ C. and preferably $0°$ to $10°$ C.

The coupling reactions according to a), b) and c) are likewise carried out under customary conditions known per se. It is advantageous to work at a slightly acidic, neutral or alkaline pH and at temperatures of about $-5°$ to $30°$ C., preferably $0°$ to $15°$ C., in an aqueous or aqueous-organic medium. For each of the coupling reactions, a neutral or alkaline medium and in particular a slightly alkaline medium, i.e. a medium having a pH from, for example, 7.5 to 12 and in particular 8 to 10, is preferred; the pH can be adjusted and stabilized by the addition of bases, for example, alkali metal hydroxides, alkali metal carbonates or alkali metal acetates, such as lithium hydroxide or carbonate, sodium hydroxide or carbonate or potassium hydroxide or carbonate, sodium acetate etc., ammonia or organic amines. The hydrolysis of the acylamino compounds of the formula (5) to give the corresponding amino compounds according to process step b) is also carried out in a manner known per se, advantageously by heating the compounds in an aqueous-alkaline medium, for example by adding one of the above mentioned bases, for example sodium hydroxide or potassium hydroxide, to the crude solution of the compound of the formula (5) obtained according to a), and heating the mixture to reflux.

The compounds of the formulae (3), (4) and (6) are in general used in equimolar amounts or in a certain excess amount, which can be up to 100%, relative to the 1,3-dihydroxybenzene.

The invention also relates to the unmetallized compounds of the formula (1), which are novel.

The metallization of the compounds of the formula (1) is carried out in a manner known per se, for example in aqueous medium at temperatures of 10° to 100° C., preferably 20°–50° C. under atmospheric pressure at a pH of, for example, 23 to 12, preferably 3 to 9.

Examples of suitable metal-releasing agents are iron(II) or iron(III) chloride, iron(II) or iron(III) sulfate or iron(II) or iron(III) nitrate, cobalt acetate, cobalt sulfate or cobalt chloride; nickel acetate, nickel formate, nickel sulfate or nickel chloride; chromium fluoride, chromium sulfate, chromium acetate, chromium formate or chromium salicylate, or copper carbonate, copper chloride, copper sulfate or copper acetate.

The use of iron-releasing agents as metallizing agents and, of these, in particular the use of iron(III) sulfate is preferred.

The novel metal complexes of compounds of the formula (1) obtainable by the above process are advantageously isolated in the form of their salts, in particular their alkali metal salts, such as lithium salts, potassium salts or sodium salts, or ammonium salts or salts of organic amines having a positively charged nitrogen atom, for example alkanolammonium salts.

The compounds of the formula (1) and their metal complexes are anionic dyes and are in general suitable for the dyeing of textile and non-textile substrates which can be dyed with anionic dyes, for example for the dyeing of fibre material made of natural or regenerated cellulose, natural or synthetic polyamides, polyurethanes or base-modified polyolefins, furthermore for the colouring of anodized aluminum or for the dyeing of leather and furs.

The dyes according to the invention can be advantageously used, for example, for the dyeing of cellulose non-wovens, and for the colouring of wood and paper. Suitable fibre materials are in particular cotton and natural polyamides, such as wool and silk, while nylon and base-modified polypropylene are predominant as synthetic fibre materials.

The metal complexes according to the invention of the formula (1) are preferably suitable for the dyeing of furs and in particular of leather, all types of leather, for example chrome leather, retanned leather or velour leather of goat, sheep, cow and pig, being suitable.

Dyeings of good general fastness properties, such as diffusion, light and acid and alkali fastness, are obtained. The dyes according to the invention have good exhaustion, good stability to acid and alkali, good stability to electrolytes and good build-up properties on a wide range of leather types such as pure chrome leather and retanned leather.

The compounds according to the invention of the formula (1) and their metal complexes are also suitable as components of inks and in particular of recording fluids for the ink-jet process.

The examples which follow serve to illustrate the invention, without limiting it thereto. Parts and percentages are by weight.

EXAMPLE 1

17.3 parts of aniline-3-sulfonic acid are diazotized in the usual manner with sodium nitrite and hydrochloric acid, and the diazo solution is added dropwise at 0° to 5° C. to a suspension of 15.1 parts of 2-acetylaminophenol in 25 parts of water and 40 parts of ice, during which the pH of the coupling is kept at 9 by the addition of sodium hydroxide solution. Stirring at 0° to 5° C. is continued for 1 hour, 25 parts of 30% sodium hydroxide solution are then added, and the reaction mixture is heated under reflux for about 1.5 hours. Common salt is then added, the pH is reduced to about 3.5 with hydrochloric acid, and the salted-out aminoazo compound is filtered off.

The aminoazo compound obtained is dissolved in 170 parts of water and 17 parts of 30% sodium hydroxide solution, 21.7 parts of 4N sodium nitrite solution are added, and the entire batch is added dropwise to a mixture consisting of 43 parts of concentrated hydrochloric acid and 56 parts of ice. Stirring at 0° to 5° C. is continued for 1 hour, and the diazo solution obtained is added dropwise at 0° to 5° C. to a solution consisting of 9.6 parts of resorcinol, 93 parts of water, 18 parts of calcined sodium carbonate and 50 parts of ice over a period of 30 minutes; the pH in the second coupling reaction is kept at 9 by addition of sodium hydroxide solution. Stirring is continued for 2.5 hours, the pH of the solution of the disazo compound obtained is brought to 9.5, and the aqueous solution of the diazo compound of 38.4 parts of 1-amino-2-hydroxy-6-nitronaphthalene-4-sulfonic acid is added at 0° to 5° C. over a period of about 45 minutes. The pH in this third coupling reaction is kept at 9.5 by addition of sodium hydroxide solution. Stirring at 0° to 5° C. and a pH of 9.5 is then continued for about 8 hours. The pH is then made neutral with hydrochloric acid, 34.8 parts of iron(III) sulfate are added, the pH is brought to about 4.5 with the sodium acetate, and the reaction mixture is heated under reflux for 2 hours. At the end, the iron complex dye formed of the presumed formula

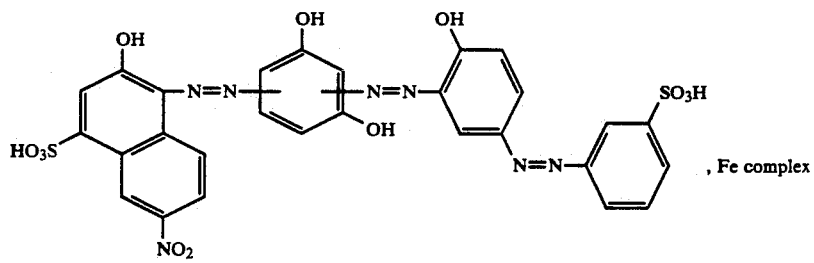

is salted out, filtered off and dried; on leather it produces dyeings in a neutral brown shade which have good general fastness properties.

EXAMPLE 2

The procedure as described in Example 1 is repeated, except that 209 parts of a 3% chromium salicylate solution are added to the solution of the trisazo dye and the mixture is heated under reflux for 2 hours, to give, after salting out, filtration and drying of the product, the corresponding chromium complex dye which produces dyeings on leather in a black hue which have good general fastness properties.

EXAMPLE 3-13

Analogously to the procedures described in Examples 1 and 2, the following metal complex dyes can be prepared which dye leather in the hues given.

| Example | Dye | Hue |
|---|---|---|
| 3 | 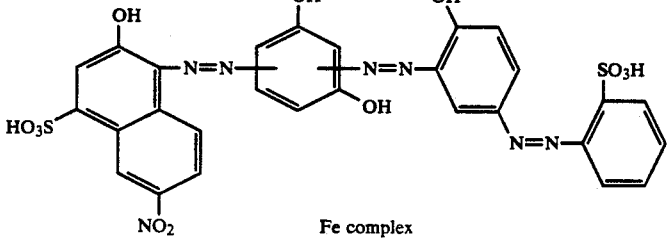 Fe complex | Brown |
| 4 | 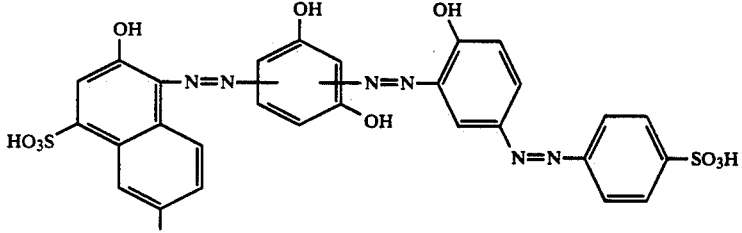 Cr complex | Grey-black |
| 5 | 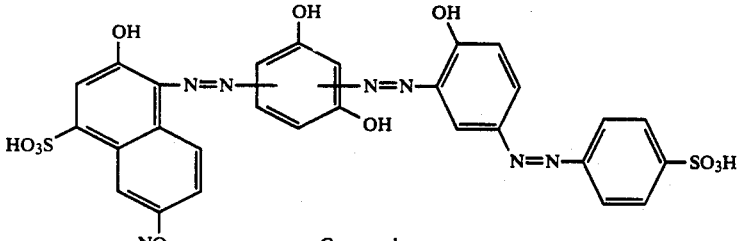 Co complex | Grey |
| 6 | 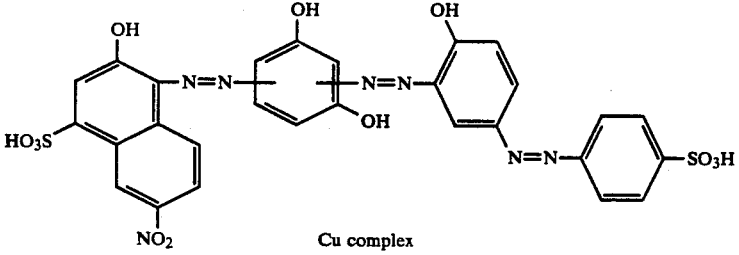 Cu complex | Black-violet |
| 7 | 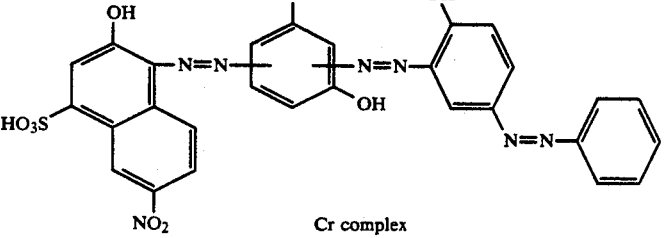 Cr complex | Black |

-continued
| Example | Dye | Hue |
|---|---|---|
| 8 | 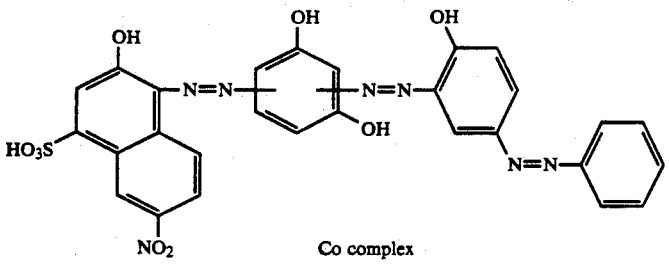 Co complex | Dark brown |
| 9 | 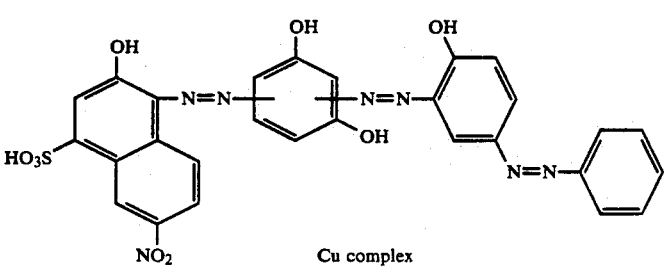 Cu complex | Bordeaux |
| 10 | 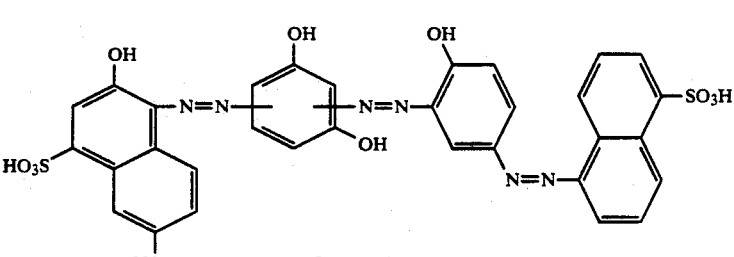 Fe complex | Brown |
| 11 | 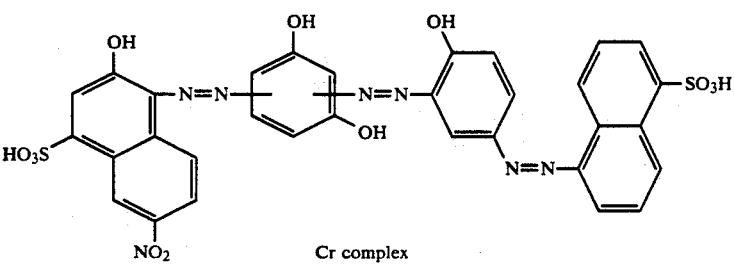 Cr complex | Grey-black |
| 12 | 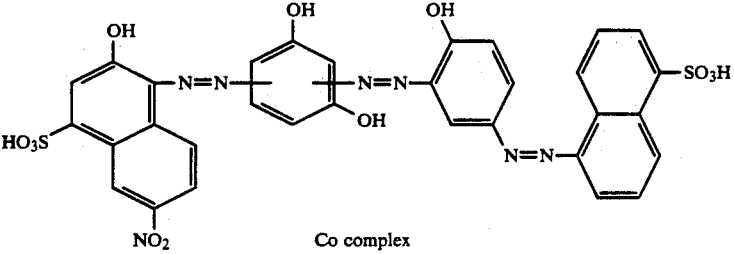 Co complex | Olive-black |
| 13 | 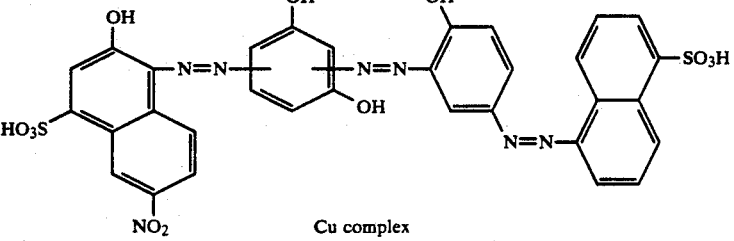 Cu complex | Black-violet |

-continued

| Example | Dye | Hue |
|---|---|---|
| 14 | (structure) Fe complex | Brown |
| 15 | (structure) Co complex | Red-brown |
| 16 | (structure) Cr complex | Blue-black |
| 17 | (structure) Fe complex | Brown |
| 18 | (structure) Co complex | Red-brown |
| 19 | (structure) Cr complex | Blue-black |

DYEING PROCEDURE FOR LEATHER 100 parts of clothing velour leather are milled at 50° C. in a solution of 1000 parts of water and 2 parts of 24% ammonia for 2 hours and then dyed at 60° C. in a solution of 1000 parts of water, 2 parts of 24% ammonia and 3 parts of dye according to Example 1 for 1 hour. A solution of 40 parts of water and 4 parts of 85% formic acid is then added, and the dyeing is continued for another 30 minutes. The leathers are then thoroughly rinsed and, if desired, treated with another 2 parts of a

What is claimed is:

1. A metal complex, said metal selected from the group consisting of cobalt, nickel, chromium, copper and iron, of a compound of the formula

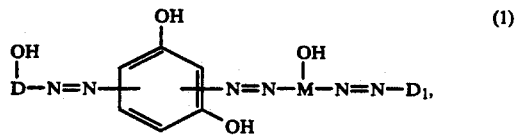

where

D is derived from the radical of a 1- or 2-naphthylamine or of aminobenzene which is unsubstituted or substituted by $C_1$-$C_4$alkyl, $C_1$-$C_4$alkoxy, halogen, trifluoromethyl, $C_1$-$C_4$alkylsulfonyl, sulfamoyl, N-mono- or N,N-di-$C_1$-$C_4$alkylsulfamoyl, carbamoyl, N-mono- or N,N-di-$C_1$-$C_4$alkylcarbamoyl, sulfo, nitro, cyano, carboxyl, phenoxy, $C_1$-$C_4$alkanoylamino or $C_1$-$C_4$alkoxycarbonyl and has a hydroxyl group in the ortho position relative to the amino group;

$D_1$ is derived from a radical of an aminobenzene or of 1- or 2-naphthylamine which is unsubstituted or substituted as described for D; and the radical —M(OH)— has the formula

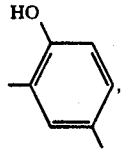

in which the hydroxyl group is in the o-position relative to the azo group linking M with resorcinol.

2. A metal-free trisazo dyestuff of the formula (1) according to claim 1.

3. A metal complex according to claim 1, wherein D—OH is derived from the radical of an unsubstituted or chlorine-, nitro-, sulfo-, methyl-, methoxy-, methylsulfonyl-, carbamoyl-or sulfamoyl-substituted o-aminophenol.

4. A metal complex according to claim 1, wherein D—OH is derived from the radical of an unsubstituted or sulfo-, nitro- or chlorine-substituted o-aminonaphthol.

5. An iron complex according to claim 1.

6. A metal complex according to claim 1, wherein $D_1$ is derived from an unsubstituted or sulfo-, nitro-, chlorine-, methyl-, methoxy-, methylsulfonyl-, carbamoyl- or sulfamoyl-substituted radical of an aminobenzene or of 1- or 2-naphthylamine.

7. A metal complex according to claim 1, wherein $D_1$ is derived from the radical of aniline-2-, -3- or -4-sulfonic acid.

8. A cobalt, nickel, chromium, copper or iron complex of a compound of the formula

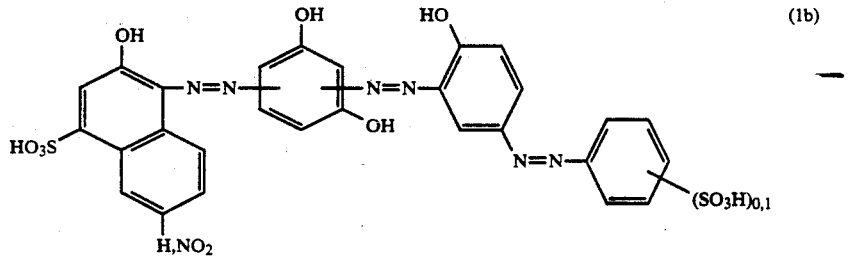

in which $R_1$ is as defined hydrogen, $C_1$-$C_4$alkyl, $C_1$-$C_4$alkoxy, halogen, nitro or sulfo, $R_2$ is hydrogen, nitro, sulfo or chlorine, $R_3$ is hydrogen, nitro, chlorine, methyl, methoxy, methylsulfonyl, carbamoyl or sulfamoyl and n is the number 0 or 1.

9. An iron, cobalt, chromium or copper complex of a compound of the formula

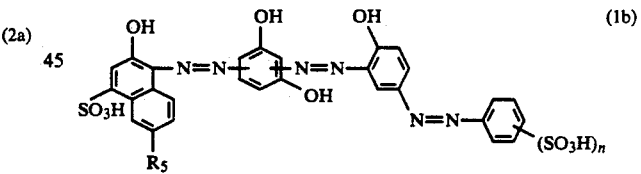

wherein $R_5$ is H or $NO_2$ and n is the number 0 or 1.

* * * * *